United States Patent
Chu et al.

(10) Patent No.: US 8,917,029 B2
(45) Date of Patent: Dec. 23, 2014

(54) LED DRIVER

(75) Inventors: Chih-Wei Chu, New Taipei (TW);
Yu-Nan Yen, Zhudong Township, Hsinchu County (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 184 days.

(21) Appl. No.: 13/484,171

(22) Filed: May 30, 2012

(65) Prior Publication Data
US 2013/0038233 A1     Feb. 14, 2013

(30) Foreign Application Priority Data
Aug. 12, 2011   (TW) .............................. 100128880 A

(51) Int. Cl.
H05B 37/02   (2006.01)
G05F 1/618   (2006.01)
H05B 33/08   (2006.01)

(52) U.S. Cl.
CPC ........ H05B 33/0815 (2013.01); H05B 33/0827 (2013.01); Y02B 20/347 (2013.01)
USPC ............ 315/224; 315/185 R; 341/155; 345/82

(58) Field of Classification Search
CPC .............................. H05B 37/02; H05B 33/0839
USPC ........................................................ 315/224
See application file for complete search history.

(56) References Cited

U.S. PATENT DOCUMENTS

| | | | | |
|---|---|---|---|---|
| 6,801,068 B2* | 10/2004 | Yin | ............................... | 327/172 |
| 8,299,988 B2* | 10/2012 | Oishi et al. | ...................... | 345/82 |
| 2009/0167398 A1* | 7/2009 | Oishi et al. | ..................... | 327/261 |
| 2010/0164394 A1* | 7/2010 | Liu | ............................... | 315/287 |
| 2010/0259177 A1* | 10/2010 | Mednik et al. | ............ | 315/185 R |
| 2010/0289424 A1* | 11/2010 | Chang et al. | .................. | 315/250 |
| 2010/0327835 A1* | 12/2010 | Archibald | ..................... | 323/282 |
| 2011/0068965 A1* | 3/2011 | Sasaki et al. | .................. | 341/155 |
| 2011/0204817 A1* | 8/2011 | Han | ............................... | 315/294 |
| 2013/0009556 A1* | 1/2013 | Szczeszynski et al. | ... | 315/185 R |
| 2013/0009557 A1* | 1/2013 | Szczeszynski | ................ | 315/186 |

* cited by examiner

Primary Examiner — Alexander H Taningco
Assistant Examiner — Tanina Bradley

(57) ABSTRACT

A light-emitting diode (LED) driver is provided. The LED driver, providing a drive voltage for driving an LED circuit according to an input voltage, includes a current regulator, a dimming signal generator, and a boost converter. In response to a pulse width modulation (PWM) dimming signal, the current regulator enables the LED circuit in a first PWM period and disables the LED circuit outside the first PWM period. The dimming generator generates a prolonged PWM dimming signal according to the PWM dimming signal. The prolonged PWM dimming signal has a prolonged period, a length of which is associated with a level of an input voltage. In response to the prolonged PWM dimming signal, the boost converter is enabled in a second PWM period and maintains a level of the drive voltage according to the input voltage.

4 Claims, 5 Drawing Sheets

US 8,917,029 B2

LED DRIVER

This application claims the benefit of Taiwan application Serial No. 100128880, filed Aug. 12, 2011, the subject matter of which is incorporated herein by reference.

BACKGROUND OF THE INVENTION

1. Field of the Invention

The invention relates in general to a driver, and more particularly to a light-emitting diode (LED) driver.

2. Description of the Related Art

In the modern world where technologies progress along with each passing day, light-emitting diode (LED) lighting sources have been developed and are considered as an indispensible part offering conveniences in the daily life. In an application, the LED is implemented as a backlight source in a flat panel display. In general, an LED light source module includes a boost converter. The boost converter is enabled in a pulse width modulation (PWM) period of a PWM dimming signal to accordingly generate a drive voltage for driving the LED light source module according to an input voltage.

In actual situations, when a boost converter generates a drive voltage, due to an inadequate operating period of a dimming signal or an insufficient input voltage level, it is frequent that the boost converter fails to provide a stable drive voltage. Consequently, the LED light source module is also incapable of providing stable brightness. Therefore, there is a need for a solution of an LED driver for providing a stable drive voltage.

SUMMARY OF THE INVENTION

An LED driver of the disclosure includes a current regulator, a dimming signal generator and a boost converter. In response to a PWM dimming signal, the current regulator is enabled in a first PWM period to control a drive current passing through an LED circuit. The current regulator is disabled outside the first PWM period to cut off the drive current and to correspondingly disable the LED circuit. According to the PWM dimming signal, the dimming signal generator generates a prolonged PWM dimming signal having a second PWM period. The first and second PWM periods are substantially overlapped, and the second PWM period has a prolonged PWM period compared to the first PWM period. A length of the prolonged PWM period is associated with a level of an input voltage. In response to the prolonged PWM dimming signal, the boost converter is enabled in the second PWM period to maintain a level of the drive signal according to the input signal.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
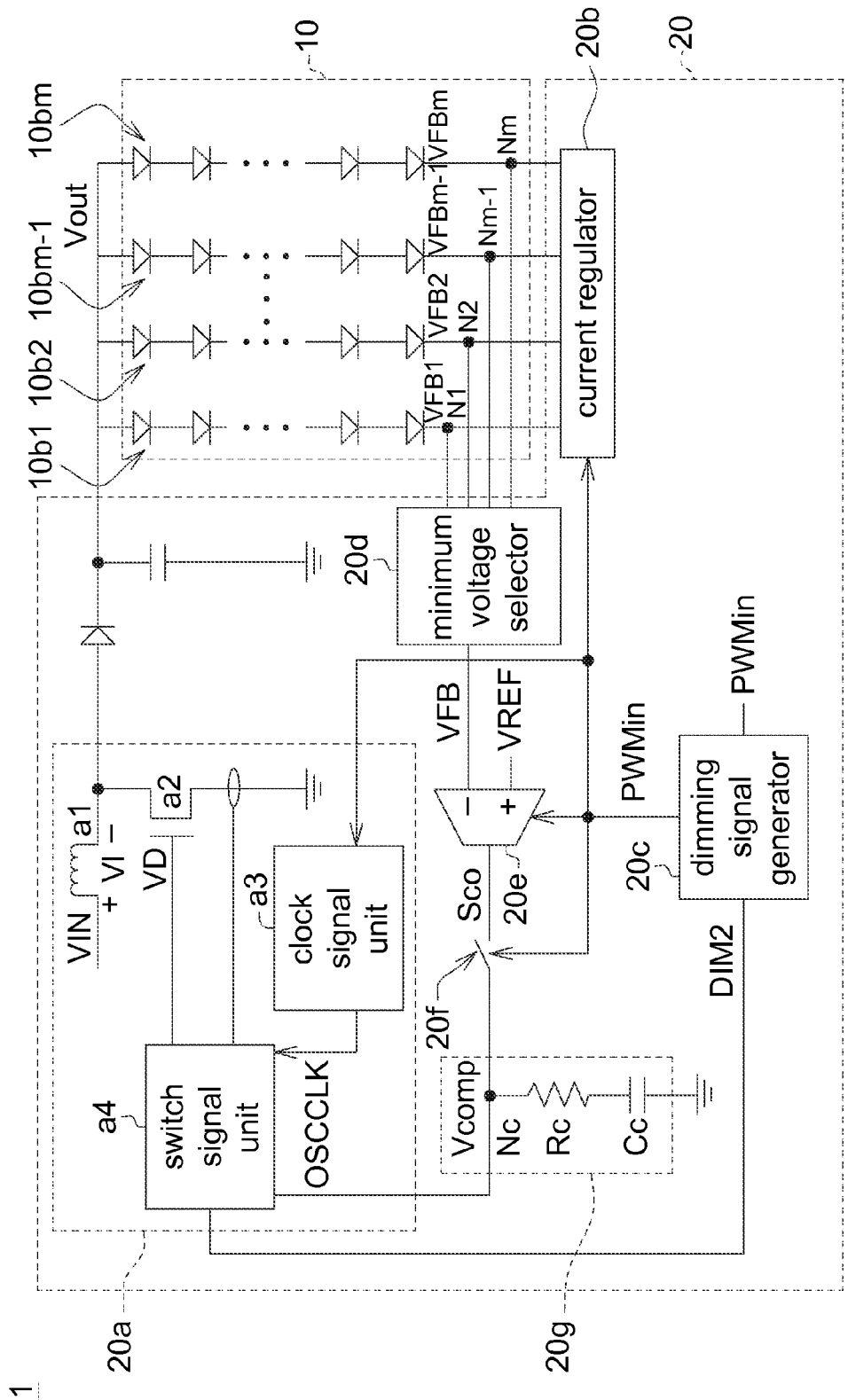
FIG. 1 is a block diagram of an LED module according to one embodiment of the present invention.

FIG. 1 shows a block diagram of a light-emitting diode (LED) module according to an embodiment of the present invention. For example, an LED module 1 serves as a backlight module in a liquid crystal display (LCD). The LED module 1 includes an LED circuit 10 and an LED driver 20. For example, the LED circuit 10 includes m number of LED serial circuits $10b1, 10b2..., $ and $10bm$ connected in parallel, where m is a natural number greater than 1. In response to a pulse width modulation (PWM) dimming signal PWMin, the LED driver 20 generates a drive voltage VOUT according to an input voltage VIN, and drives the LED circuit 10 with the drive voltage VOUT.

The LED driver 20 includes a boost converter 20a, nodes N1, N2 ..., and Nm, a current regulator 20b, a dimming signal generator 20c, a minimum voltage selector 20d, an error amplifier 20e, a switch 20f, and a voltage storage unit 20g.

The current regulator 20b is coupled to the LED serial circuits $10b1$ to $10bm$ via the nodes N1 to Nm, respectively. In response to the PWM dimming signal PWMin, the current regulator 20b is enabled in a PWM period TP1 to control drive currents passing through the LED serial circuits $10b1$ to $10bm$ of the LED circuit 10. Further, outside the first PWM period TP1, the current regulator 20b is disabled to cut off the foregoing drive currents and to corresponding disable the LED circuit 10. For example, the nodes N1 to Nm respectively have voltage signals VFB1 to VFBm.

In response to the PWM dimming signal PWMin, the minimum voltage selector 20d and the error amplifier 20e are enabled in the PWM period TP1, so as to determine a relationship between a level of a voltage signal VFB having a lowest level among the voltage signals VFB1 to VFBm and a reference voltage level VREF to further determine an output voltage Vcomp of the error amplifier 20e. The switch 20f is coupled between the error amplifier 20e and the voltage storage unit 20g. In response to the PWM dimming signal PWMin, the switch 20f is turned off outside the PWM period TP1 to disconnect the error amplifier 20e from the voltage storage unit 20g. Also in response to the PWM dimming signal PWMin, the switch 20f is turned on in the PWM period TP1 to provide the output voltage Vcomp provided by the error amplifier 20e to the voltage storage unit 20g. The voltage storage unit 20g includes a node Nc, a resistor Rc and a feedback compensation capacitor Cc.

The boost converter 20a includes storage element a1, a switch element a2, a clock signal unit a3, and a switch signal unit a4. For example, the storage element 1a is an inductor that stores an energy-storing voltage V1 in response to the input voltage VIN. In response to the PWM dimming signal PWMin, the clock signal unit a3 provides an oscillation clock signal OSCCLK. A leading edge of the oscillation clock signal OSCCLK and a leading edge of the PWM dimming signal PWMin are triggered at a substantially same time point.

In response to a prolonged PWM dimming signal DIM2, the switch signal unit a4 is enabled to provide a switch clock signal VD according to the error amplifier output voltage Vcomp and the oscillation clock signal OSCCLK. The switch element a2 is coupled to the storage element a1, and is selectively turned on in response to the switch clock signal VD to generate the drive voltage VOUT according to the energy-storing voltage V1 and the input voltage VIN.

Figure 2:
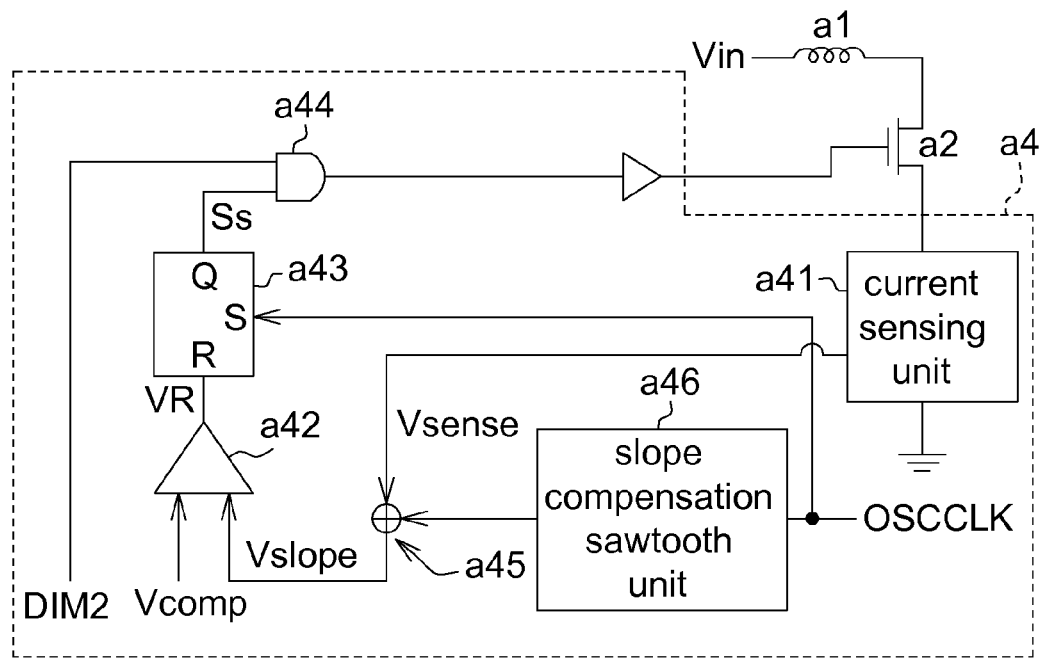
FIG. 2 is a detailed block diagram of a switch signal unit in FIG. 1.
Figure 3:
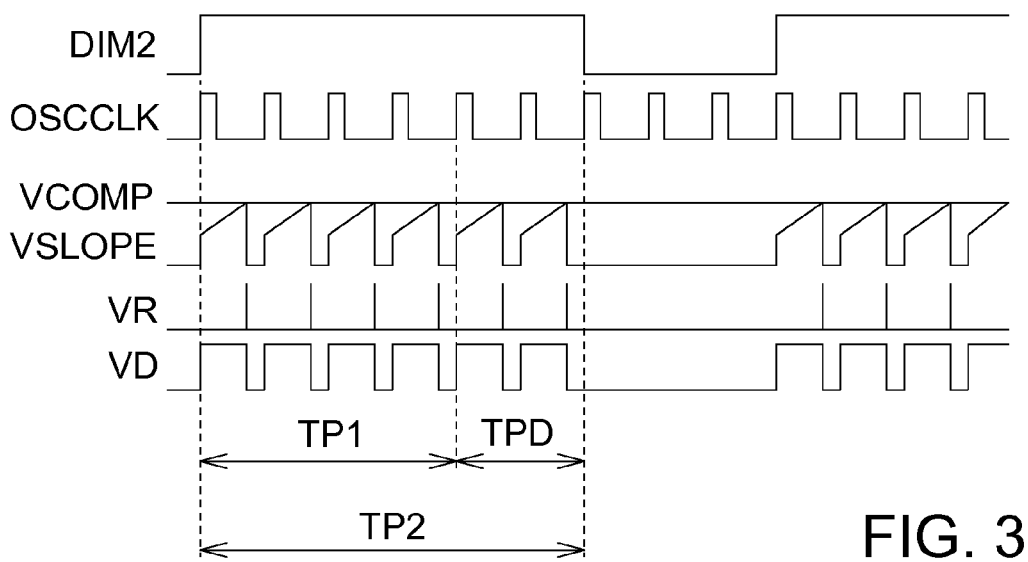
FIG. 3 is a timing diagram of associated signals of the switch signal unit in FIG. 2.

FIG. 2 shows a detailed block diagram of the switch signal unit a4 in FIG. 1; FIG. 3 shows a timing diagram of associated signals in FIG. 2. The switch signal unit a4 includes a current sensing unit a41, a comparing unit a42, a flip-flop a43, a logic unit a44, an adder a45 and a slope compensation sawtooth unit a46. The current sensing unit a41 senses a current of the turned on switch element a2 to obtain a voltage signal Vsense. The slope compensation sawtooth unit a46 generates a slope compensation sawtooth signal according to the oscillation clock signal OSCCLK.

The adder a45 generates an integration voltage Vslope according to the voltage signal Vsense and the slope compensation sawtooth signal generated according to the oscillation clock signal OSCCLK. The comparing unit a42 compares whether the integration voltage Vslope is substantially higher than the error amplifier output voltage Vcomp, and provides an enable reset signal VR when the integration voltage Vslope is substantially higher than the error amplifier output voltage Vcomp.

The flip-flop a43 provides an enable intermediate signal Ss in response to an enable oscillation clock signal OSCCLK, and provides a disable intermediate signal Ss in response to the enable reset signal VR. In response to a prolonged PWM dimming signal DIM2, the logic unit a44 is enabled to generate the switch clock signal VD according to the intermediate signal Ss. In other words, the switch signal unit a4 determines whether the integration voltage Vslope is substantially higher than the error amplifier output voltage Vcomp, and resets the switch clock signal VD for the comparing unit a42 in the switch signal unit a4 when the integration voltage Vslope is substantially higher than the error amplifier output voltage Vcomp. Hence, the LED circuit 10, the minimum voltage selector 20d, the error amplifier 20e, the switch signal unit a4 and the switch element a2 form a feedback control path to allow the drive voltage VOUT to have a stable level.

Figure 4:
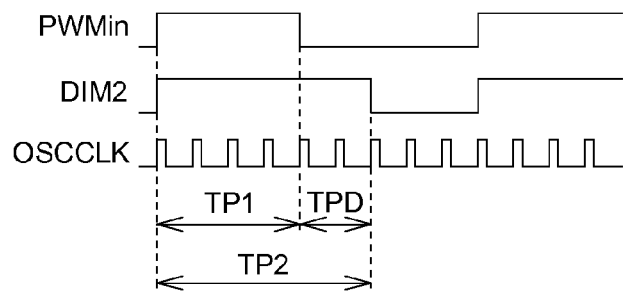
FIG. 4 is a timing diagram of associated signals of an LED driver in FIG. 1.

According to the PWM dimming signal PWMin, the dimming signal generator 20c generates the prolonged PWM dimming signal DIM2, which has a PWM period TP2 as shown in FIG. 4. For example, the PWM period TP1 is a sub-period of the PWM period TP2, the PWM periods TP1 and TP2 are substantially overlapped, and the PWM period TP2 has a prolonged PWM period TPD compared to the PWM period TP1. A length of the prolonged PWM period TPD is associated with the level of the input voltage VIN.

For example, a relationship among the PWM periods TP1 and TP2 and the prolonged PWM period is as shown in FIG. 4. In a first sub-period (i.e., the PWM period TP1), the minimum voltage selector 20d, the error amplifier 20e and the switch 20f are enabled in response to the enable PWM dimming signal PWMin to form a feedback circuit. The feedback circuit corresponds to the voltage signal VFB having the lowest level among the voltage signals VFB1 to VFBm to determine whether the level of the drive voltage VOUT is lower than a lower reference value, and to selectively provide the error amplifier output voltage Vcomp. In the first sub-period, the boost converter 20a is also enabled in response to the prolonged PWM dimming signal DIM2, so as to boost the level of the drive voltage VOUT according to the error amplifier output voltage Vcomp to provide the drive voltage VOUT with a sufficient driving capability. The voltage storage unit 20g correspondingly stores the error amplifier output voltage VOUT in the first sub-period.

In a second sub-period (i.e., the prolonged PWM period TPD), the current regulator 20b, the minimum voltage selector 20d, the error amplifier 20e and the switch 20f are disabled in response to the disable PWM dimming signal PWMin. Thus, the current on the LED circuit 10 is cut off such that the LED circuit 10 is disabled. In the second sub-period, the boost converter 20a is also continuously enabled in response to the enable prolonged PWM dimming signal DIM2, so as to continuously boost the level of the drive voltage VOUT according to the error amplifier output voltage Vcomp previously stored in the voltage storage unit 20g. As a result, in the prolonged PWM period TPD when the PWM dimming signal PWMin is disabled, the drive voltage VOUT is still provided with a sufficient driving capability.

Therefore, according to the prolonged PWM dimming signal DIM2, the boost converter 20a in the LED driver 20 of the embodiment is continuously enabled in the prolonged PWM period TP2 of the prolonged PWM dimming signal DIM2 to provide a stable drive voltage VOUT.

Detailed description on the boost converter 20a and the dimming signal generator 20c shall be given with some examples below.

Figure 5:
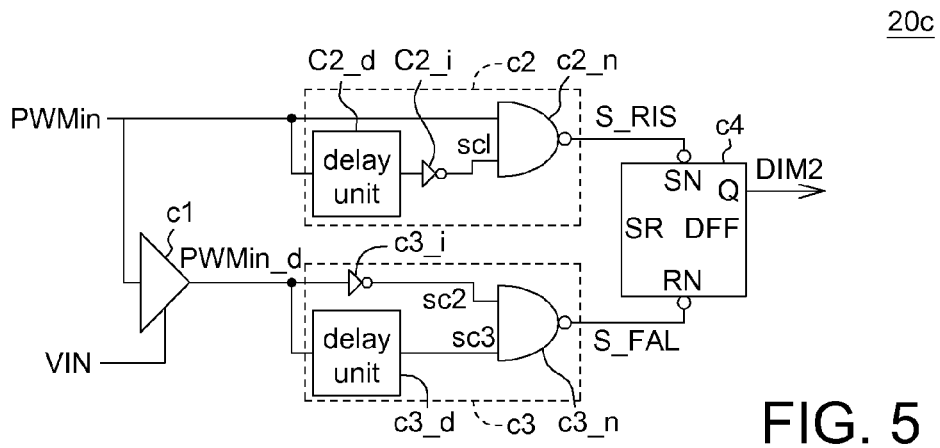
FIG. 5 is a detailed schematic diagram of a dimming signal generator in FIG. 1.
Figure 6:
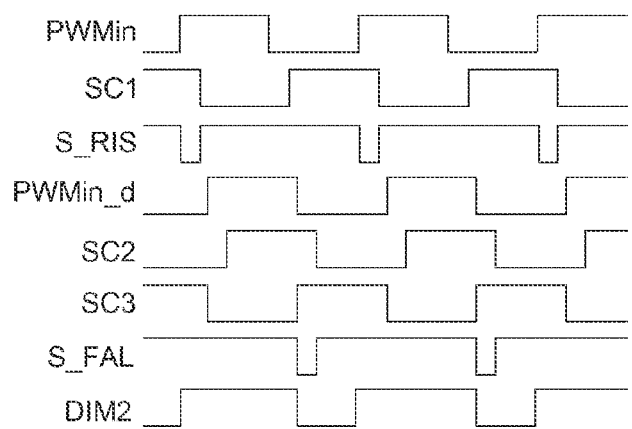
FIG. 6 is a waveform of associated signals of the dimming signal generator in FIG. 5.

FIG. 5 shows a detailed block diagram of the dimming signal generator in FIG. 1; FIG. 6 shows a waveform of associated signals of the dimming generator in FIG. 5. The dimming signal generator 20c includes a voltage-controlled delay unit c1, logic operational units c2 and c3, and a flip-flop c4. In response to the level of the input voltage VIN, the voltage-controlled delay unit c1 determines the prolonged PWM period TPD, and delays the PWM dimming signal PWMin by the prolonged PWM period TPD to output a delayed PWM dimming signal PWMin_d.

Figure 7:
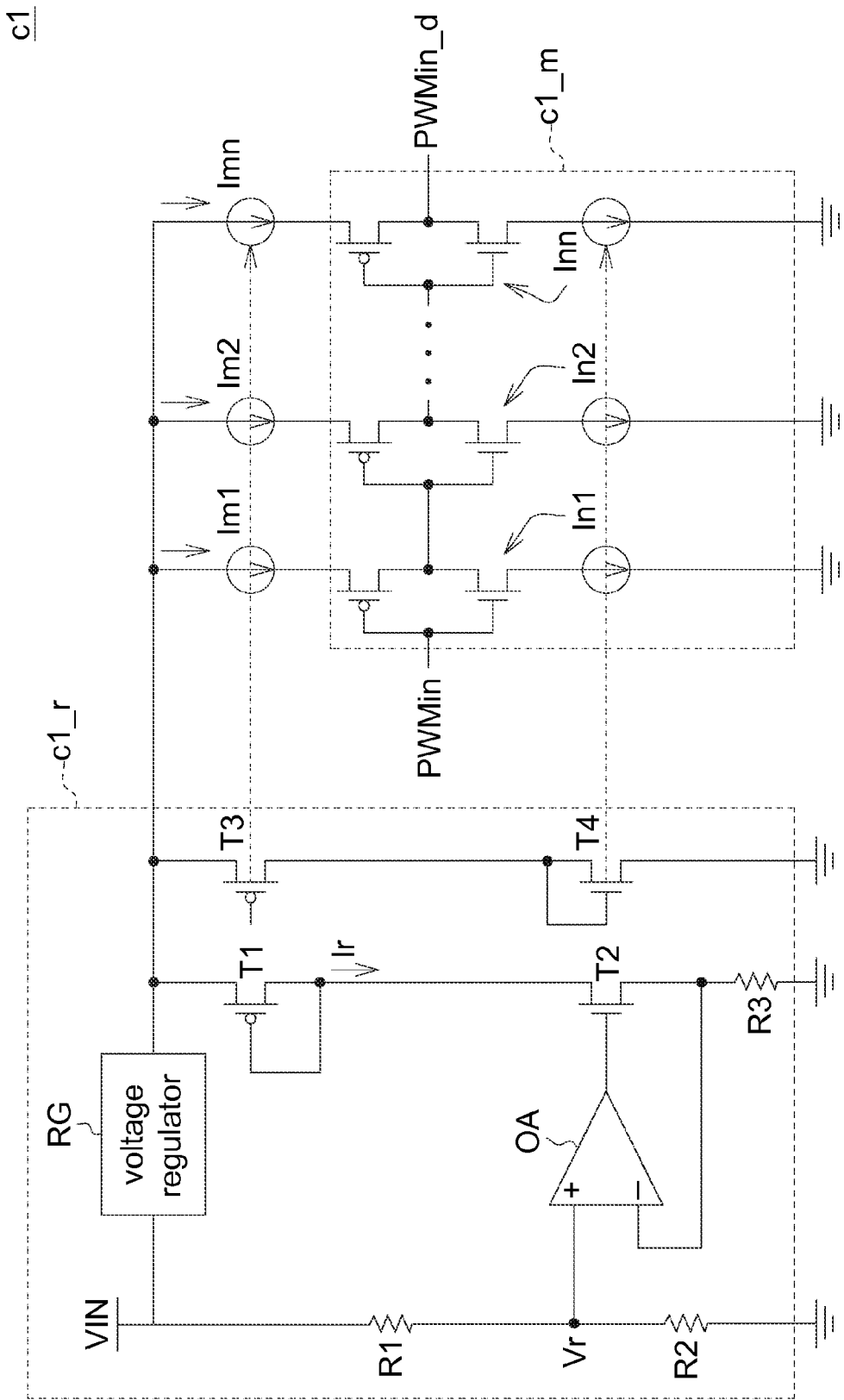
FIG. 7 is a detailed block diagram of a voltage-controlled delay unit in FIG. 5.

FIG. 7 shows a detailed block diagram of the voltage-controlled delay unit in FIG. 5. For example, the voltage-controlled delay unit c1 includes a bias unit c1_r and a delay unit c1_m. For example, the bias unit c1_r includes resistors R1 to R3, an operational amplifier OA, a voltage regulator RG and transistors T1 to T4. According to the input voltage VIN, a bias voltage Vr and a bias current Ir are determined, and a size of the bias current Ir is associated with the level of the input voltage VIN. For example, the bias current Ir satisfies:

$$Ir = \frac{Vr}{R3} = \frac{R2}{R1+R2} VIN \times \frac{1}{R3}$$

The delay unit c1_m has an operating delay time for determining the prolonged PWM period TPD. For example, the delay unit c1_m includes n number of inverters In1 to Inn, and the operating delay time is associated with currents Im1 to Imn passing through the delay unit c1_m, wherein n is a natural number greater than 1. For example, the currents Im1 to Imn are mirrored currents of the bias current Ir, and have a size positively correlated with the bias current Ir. More specifically, for a higher bias current Ir, the currents Im1 to Imn are also correspondingly higher, so that the inverters In1 to Inn are correspondingly given a shorter delay time. Thus, the prolonged PWM period TPD determined by the delay unit c1_m is correspondingly shorter. For a lower bias current Ir, the currents Im1 to Imn are also correspondingly lower, so that the inverters In1 to Inm are correspondingly given a longer delay time. Thus, the prolonged PWM period TPD determined by the delay unit c1_m is correspondingly longer. Accordingly, the delay unit c1_m correspondingly determines the bias current Ir according to the size the input voltage VIN, and determines the prolonged PWM period TPD (i.e., the operating delay time) according to the size of the bias current Ir to correspondingly provide a delay circuit having a voltage-controlled delay function.

According to the PWM dimming signal PWMin, the logic operational unit c2 provides a leading edge sampling signal S_RIS indicative of a leading edge of the PWM dimming signal PWMin. For example, the leading edge of the PWM dimming signal PWMin and the leading edge of the leading edge sampling signal S_RIS are respectively a rising edge and a falling edge, and the leading edge sampling signal S_RIS and the leading edge of the PWM dimming signal PWMin are triggered at a substantially same time point. In an embodiment, the logic operational unit c2 includes a delay unit c2_d, an inverter gate c2_i and a NAND gate c2_n. The delay unit c2_d and the inverter gate c2_i generate a signal Sc1 according to the PWM dimming signal PWMin, and the NAND gate c2_n generates the leading edge sampling signal S_RIS according to the PWM dimming signal and the signal Sc1.

According to the delayed PWM dimming signal PWMin_d, the logic operational unit c3 provides a trailing edge sampling signal S_FAL indicative of a trailing edge of the delayed PWM dimming signal PWMin_d. For example, each of the trailing edge of the delayed PWM dimming signal PWMin_d and the leading edge of the trailing edge sampling signal S_FAL is a falling edge, and the leading edge of the trailing edge sampling signal S_FAL and the trailing edge of the delayed PWM dimming signal PWMin_d are triggered at a substantially same time point. In an embodiment, the logic operational unit c3 includes a delay unit c3_d, an inverter gate c3_i and a NAND gate c3_n. The inverter gate c3 i generates a signal Sc2 according to the delayed PWM dimming signal PWMin d, the delay unit c3_d generates a signal Sc3 according to the delayed PWM dimming signal PWMin_d, and the NAND gate c3_n generates the trailing edge sampling signal S_FAL according to the signals Sc2 and Sc3.

In response to the leading edge sampling signal S_RIS, the flip-flop c4 triggers the leading edge (e.g., a rising edge) of the prolonged PWM dimming signal DIM2. Further, in response to the trailing edge sampling signal S_FAL, the flip-flop c4 triggers the trailing edge (e.g., a falling edge) of the prolonged PWM dimming signal DIM2. For example, the flip-flop c4 is a negative edge-triggered flip-flop.

The boost converter 20a includes the storage element al, the switch element a2, the clock signal unit a3, and the switch signal unit a4. For example, the storage element 1a is an inductor that stores an energy-storing voltage V1 in response to the input voltage VIN. A waveform of the inductor current passing through the storage element a1 is as shown by a curve IL in FIG. 2. The switch element a2 is coupled to the storage unit a1, and is selectively turned on in response to the switch clock signal VD to generate the drive voltage VOUT according to the energy-storing voltage V1 and the input voltage VIN.

In response to the PWM dimming signal PWMin, the clock signal unit a3 provides the oscillation clock signal OSCCLK. The leading edge of the oscillation clock signal OSCCLK and the leading edge of the PWM dimming signal PWMin are triggered at a substantially same time point. In response to the prolonged PWM dimming signal DIM2, the switch signal unit a4 is enabled to provide the switch clock signal VD according to the oscillation clock signal OSCCLK.

Detailed description for the circuits of the clock signal unit a3 and the switch signal unit a4 shall be given with some examples below.

Figure 8:
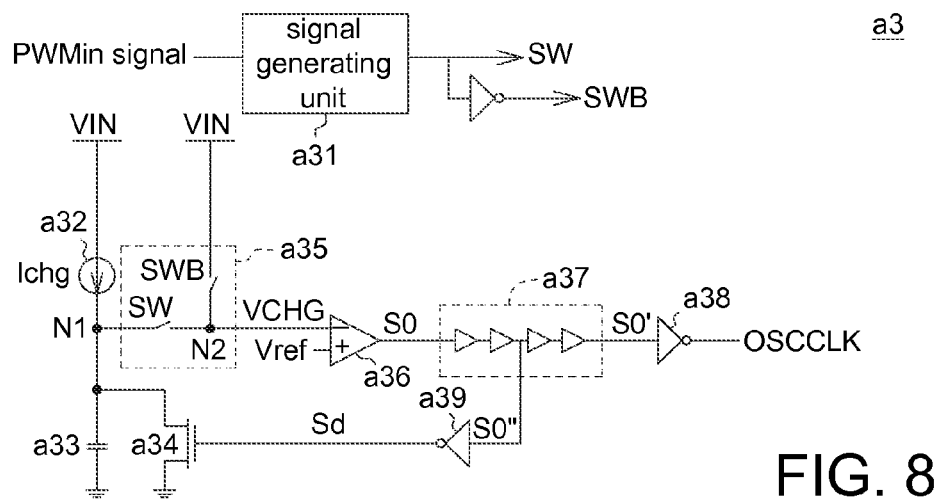
FIG. 8 is a detailed block diagram of a clock signal unit in FIG. 1.
Figure 9:
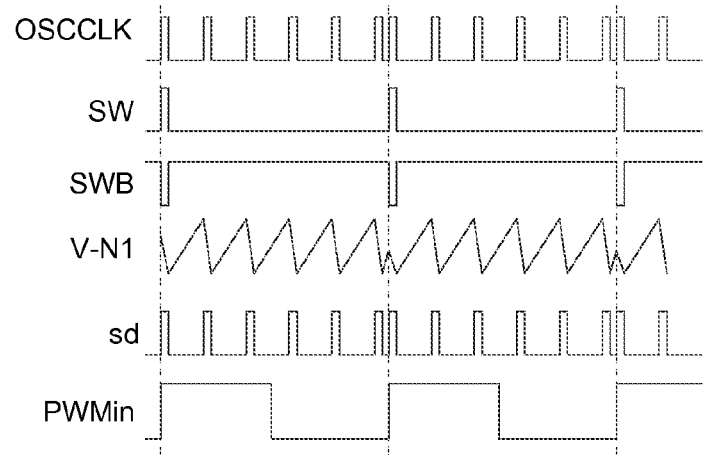
FIG. 9 is a timing diagram of associated signals of the clock signal unit in FIG. 8

FIG. 8 shows a detailed block diagram of the clock signal unit in FIG. 1; FIG. 9 shows a timing diagram of associated signals in FIG. 8. The clock signal unit a3 includes a pulse generating unit a31, which generates a pulse signal SW and an inverted signal SWB of the pulse signal SW according to the PWM dimming signal PWMin. A leading edge (e.g., a rising edge) of the pulse signal SW and a leading edge (e.g., a rising edge) of the PWM dimming signal PWMin are triggered at a substantially same time point.

The clock signal unit a3 further includes a current source a32, a capacitor a33, a transistor a34, a switch unit a35, a comparator a36, a delay unit a37, and inverters a38a and a39. The current source a32 and the capacitor a33 are coupled to a node N1. The current source a32 provides a charging current Ichg for charging the capacitor a33, so that the node N1 has a charging voltage. In response to an oscillation clock signal Sd, the transistor a34 is turned on to form a discharging path, such that the charging voltage at the node N1 is discharged through the discharging path formed via the turned on transistor a34. For example, the node N1 has a voltage V-N1 having a waveform as shown in FIG. 9. The comparator a36 has a positive input for receiving a reference voltage Vref and a negative input coupled to a node N2. The node N2 has a voltage signal VCHG. The level of the reference voltage Vref is lower than the level of the input voltage VIN.

The switch unit a35 is coupled to the nodes N1 and N2. In response to the high-level pulse signal SW and the low-level inverted signal SWB, the switch unit a35 provides the input voltage VIN to the node N2, such that the voltage at the negative input (=the input voltage VIN) of the comparator a36 is higher than the voltage at the positive input (=the reference voltage Vref) of the comparator a36. Accordingly, the comparator a36 provides an output signal So corresponding to a low level. The delay unit a37 delays the output signal So to output delayed output signals So' and So". The inverter a38 receives and inverts the delayed output signal So' to output the oscillation clock signal OSCCLK corresponding to a high level. Hence, the rising edge of the oscillation clock signal OSCCLK is able to correspond to the rising edge of the PWM dimming signal PWMin. The inverter a39 receives and inverts the delayed output signal So" to output the oscillation clock signal Sd corresponding to a high level. Hence, the rising edge of the oscillation clock signal Sd is able to correspond to the rising edge of the PWM dimming signal PWMin, so that the voltage at the node N1 is discharged to a ground voltage.

In response to the low-level pulse signal SW and the high-level inverted signal SWB, the switch unit a35 shorts the nodes N1 and N2, so that the voltage at the negative input of the comparator a36 equals the voltage at the node N1 that has an initial voltage corresponding to a ground voltage level. Accordingly, the voltage at the negative input (=the ground voltage) of the comparator a36 is lower than the voltage at the positive input (=the reference voltage Vref) of the comparator a36, and the comparator a36 then provides the output signal So corresponding to a high level. The delay unit a37 delays the output signal So to output delayed output signals So' and So". The inverters a38 and a39 output the oscillation clock signals OSCCLK and Sd corresponding to a low level. Hence, the transistor a34 is cut off to disconnect the discharging path formed via the node N1, such that the voltage at the node N1 rises as the charging current Ichg charges the capacitor a33.

As the charging time increase, the voltage at the node N1 correspondingly rises. Once the voltage at the node N1 corresponds to a level higher than the reference voltage Vref, the comparator a36 provides the low-level output signal So, the delay unit a37 correspondingly provides the low-level delayed output signals So' and So", the inverters a38 and a39 output the oscillation clock signals OSCCLK and Sd corresponding to a high level, and the transistor a34 is turned on to have the voltage at the node N1 correspondingly discharge to the ground voltage. Hence, the voltage at the negative input (=the ground voltage) of the comparator a36 is again lower than the voltage at the positive input (=the reference voltage Vref) of the comparator a36, and the comparator a36 then provides the output signal So corresponding to a high level. The delay unit a37 delays the output signal So to output the delayed signals So' and So", and the inverters a38 and a39 output the oscillation clock signals OSCCLK and Sd corresponding to a low level. Accordingly, the transistor a34 is cut off to disconnect the discharging path formed via the node N1, such that the voltage at the node N1 rises as the charging current Ichg charges the capacitor a33.

By repeating the above operations, the clock signal unit a3 is able to correspondingly generate the oscillation clock signal OSCCLK, which has a rising edge triggered at a substantially same time point as the rising edge of the PWM dimming signal PWMin.

Figure 10:
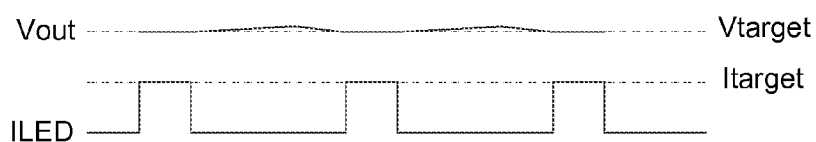
FIG. 10 is a timing diagram of associated signals of a drive voltage Vout and a drive current ILED.
Figure 11:
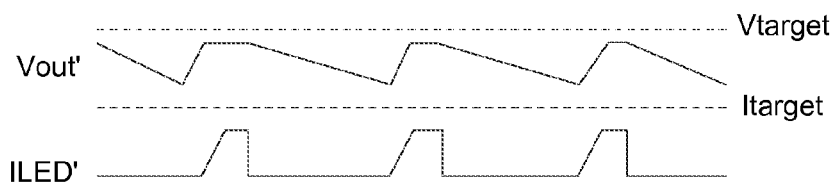
FIG. 11 is a timing diagram of associated signals of a drive voltage Vout' and a drive current ILED'.

With the description above, it is illustrated that the LED driver 20 according to the embodiment determines a width of the prolonged PWM dimming signal DIM2 with reference to the level of the input voltage VIN, as shown in FIGS. 5 to 7. Therefore, the LED driver 20 according to the embodiment is capable of effectively providing a stable drive voltage Vout to further provide a stable drive current for driving the LED circuit 10. For example, the level of the drive voltage Vout and the waveform of the drive current ILED are as shown in FIG. 10. The drive voltage Vout steadily corresponds to a predetermined voltage level Vtarget, and the drive current ILED steadily corresponds to a predetermined current value Itarget. In contrast, in a conventional LED driver with an input voltage of a lower level, when a width of an input dimming pulse is small, a time required for an inductor to store energy is frequently insufficient, such that the level of the drive voltage Vout and the size of the drive current cannot be maintained, as a drive voltage Vout' and an LED drive current ILED' shown in FIG. 11. Consequently, problems of glittering or unstable brightness in the LED circuit are resulted. Therefore, in the LED driver according to the embodiment, the inductor energy-storing time (DIM2) is increased according to the size of the input voltage VIN to maintain a stable LED current.

The LED driver according to the disclosed embodiment implements the dimming signal generator to generate the prolonged PWM dimming signal according to the PWM dimming signal. The prolonged PWM dimming signal has a prolonged PWM period compared to the PWM dimming signal. The length of the prolonged PWM period is associated with the level of the input voltage. The LED driver according to the disclosed embodiment further implements the boost converter, which is enabled in the PWM period in response to the prolonged PWM dimming signal to maintain the level of the drive voltage according to the input voltage. Therefore, compared to a conventional LED driver, the LED driver of the disclosed embodiment is capable of flexibly increasing the driving capability of the boost converter with reference to the level of the input voltage to provide a stable LED drive voltage.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A light-emitting diode (LED) driver, providing a drive voltage for driving an LED circuit according to an input voltage in response to a pulse width modulation (PWM) dimming signal, the LED driver comprising:
   a current regulator, enabled in a first PWM period in response to the PWM dimming signal to control a drive current passing through the LED circuit, and disabled outside the first PWM period to cut off the drive current and to correspondingly disable the LED circuit;
   a dimming signal generator, for generating a prolonged PWM dimming signal according to the PWM dimming signal, the prolonged PWM dimming signal having a second PWM period, the first PWM period and the second PWM period substantially overlapped, the second PWM period having a prolonged PWM period compared to the first PWM period, a length of the prolonged PWM period associated with a level of the input voltage, wherein the dimming signal generator further comprises:
      a voltage-controlled delay unit, for determining the prolonged PWM period in response to the level of the input voltage, and delaying the PWM dimming signal by the prolonged PWM period to output a delayed PWM dimming signal, wherein the voltage-controlled delay unit comprises:
         a bias unit, for determining a bias current according to the input voltage, a size of the bias current associated with the level of the input voltage; and
         a delay unit, having an operating delay time for determining the prolonged PWM period, for determining the operating delay time in response to the size of the bias current, and delaying the PWM dimming signal by the operating delay time to output the delayed PWM dimming signal;
      a first logic operational unit, for providing a leading edge sampling signal indicative of a leading edge of the PWM dimming signal according to the PWM dimming signal;
      a second logic operational unit, for providing a trailing edge sampling signal indicative of a trailing edge of the delayed PWM dimming signal according to the delayed PWM dimming signal; and
      a flip-flop, for triggering a leading edge of the prolonged PWM dimming signal in response to the leading edge sampling signal, and triggering a trailing edge of the prolonged PWM dimming signal in response to the trailing edge sampling signal; and
   a boost converter, enabled in the second PWM period in response to the prolonged PWM dimming signal to maintain a level of the drive voltage according to the input voltage.

2. The LED driver according to claim 1, wherein the boost converter comprises:
   a storage element, for storing an energy-storing voltage in response to the input voltage;
   a switch element, coupled to the storage element, selectively turned on in response to a switch clock signal to generate the drive voltage according to the energy-storing voltage and the input voltage;

a clock signal unit, for providing an oscillation clock signal in response to the PWM dimming signal; and a switch signal unit, enabled in response to the prolonged PWM dimming signal to provide the switch clock signal according to the oscillation clock signal.

3. The LED driver according to claim 2, wherein the switch signal unit comprises:

a current sensing unit, for sensing a current signal when the switch element is turned on to generate an integration voltage;

a comparing unit, for comparing whether the integration voltage is substantially higher than a reference voltage, and providing an enable reset signal when the integration voltage is substantially higher than the reference voltage;

a flip-flop, for providing an enable intermediate signal in response to the enable oscillation clock signal, and providing a disable intermediate signal according to the enable reset signal; and a logic unit, enabled in response to the prolonged PWM dimming signal to generate the switch clock signal according to the intermediate signal.

4. The LED driver according to claim 3, further comprising:

a feedback circuit, coupled to the LED circuit, for identifying an operating voltage signal of the LED circuit, and providing the reference signal according to the operating voltage signal; and a switch circuit, coupled to the feedback circuit and the comparing unit, enabled in the first PWM period in response to the PWM dimming signal to form a path for providing the reference voltage provided by the feedback circuit to the comparing unit;

wherein, in response to the PWM dimming signal, the switch circuit is disabled outside the first PWM period so that the feedback circuit is substantially disconnected from the comparing unit.

* * * * *